(12) United States Patent
Nishino et al.

(10) Patent No.: US 6,231,966 B1
(45) Date of Patent: May 15, 2001

(54) ORIENTED POLYESTER FILM

(75) Inventors: Yasuhiro Nishino; Haruo Matsumoto, both of Tsuruga (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 08/631,052

(22) Filed: Apr. 12, 1996

(30) Foreign Application Priority Data

Apr. 14, 1995 (JP) .................................................. 7-089455

(51) Int. Cl.[7] .................................. B32B 5/16; B32B 27/36
(52) U.S. Cl. ........................... 428/330; 428/331; 428/480; 428/327; 428/910
(58) Field of Search .................................. 428/327, 330, 428/331, 402, 480, 910

(56) References Cited

U.S. PATENT DOCUMENTS 5,266,376 * 11/1993 Okazaki et al. ...................... 428/141
5,415,933 * 5/1995 Ishiguro et al. ...................... 428/336

FOREIGN PATENT DOCUMENTS

| 0 152 265 A2 | 8/1985 | (GB) . |
| 0 506 033 A1 | 9/1992 | (GB) . |
| 84-029610 | 7/1984 | (JP) . |
| 62-214518 | 9/1987 | (JP) . |
| 1-311131 | 12/1989 | (JP) . |
| 60-127349 | 9/1992 | (JP) . |

* cited by examiner

*Primary Examiner*—Vivian Chen
*Assistant Examiner*—D. Lawrence Tarazano
(74) *Attorney, Agent, or Firm*—Morrison & Foerster LLP

(57) ABSTRACT

A biaxially oriented polyester film comprising silica particles (A) having an average secondary particle size of 50–200 nm, an average primary particle size ratio (length/breadth) of 1.25–3.0 and the ratio of average primary particle size/standard deviation of primary particle size (d/σ) of 0.5–5.0 in a proportion of 0.01–1% by weight, and inactive particles (B) having an average particle size of 300–1500 nm in a proportion of 0.01–1% by weight. The polyester film of the present invention can be adapted to a high speed feeding of a film or tape in the production line and stand the use of economical parts in an attempt to achieve decreasing the costs of tapes.

9 Claims, 1 Drawing Sheet

ORIENTED POLYESTER FILM

FIELD OF THE INVENTION

The present invention relates to an oriented polyester film. More particularly, the present invention relates to an oriented polyester film suitable for magnetic tapes, which has superior slipping property, resistance to scraping, scratch resistance, slitting property, winding property and the like. Most particularly, the present invention relates to an oriented polyester film comprising inactive particles and silica particles having a specific shape and a particle size distribution.

BACKGROUND OF THE INVENTION

A biaxially oriented polyester film represented by polyethylene terephthalate films has been widely used as a medium for magnetic recording, utilizing the superior physical and chemical properties. In such biaxially oriented polyester films, slipping property, resistance to scraping, scratch resistance, slitting property and winding property exert great influence on the suitability of the film production steps and processing steps, as well as the quality of the product.

For example, magnetic tapes obtained by applying a magnetic coating on the surface of biaxially oriented polyester films have been fed at faster speeds in recent years to bring down the costs, and the feeding speed is increased in the steps of coating, calendering, slitting, housing a magnetic tape into a cassette, and duplication for manufacture of soft copies, while creating various problems.

For example, when the feeding speed of the film is increased in the coating step, the film surfaces come into contact with a die used for the application of magnetic coating, as a result of which the surface is scraped and the scraped powder causes scratches in the magnetic layer, thus decreasing the yield of the product. An increased speed in the calendering step brings about the need for more frequent cleaning of the white powder adhered to a calendering roll, thus again decreasing the productivity.

Also, an increased speed at the slitting step causes insufficient winding of the film to decrease the yield of the product. In general, an improvement in winding property involves inclusion of larger particles to decrease the coefficient of friction between films. Thus, if such film is wound at a greater speed in the slitting step for the sake of an enhanced productivity, the film slips too much and causes disturbance in winding to the extent that, in an extreme case, the film winds around a slitter blade to lower the productivity.

When a tape is housed in a cassette at a high speed, the scraped powder and scratch occur to possibly cause drop outs (loss of information). Particularly in VTR use, a cheap metallic guide having an unfinished surface may be used as a guide post to be fixed in the cassette to lower the costs. The surface of such guide post is extremely rough and a magnetic tape which is produced according to the prior art wherein slipping property and resistance to scraping of the film have been improved but a back coating is not applied [for example, a method comprising addition of inorganic particles such as silicon oxide, titanium dioxide, calcium carbonate, talc, clay and sintered kaoline (e.g., Japanese Patent Unexamined Publication No. 54-57562) and a method comprising precipitating fine particles containing calcium, lithium or phosphorus in polymerization system (e.g., Japanese Patent Examined Publication No. 52-32914)] accompanies more drop outs due to the scraped powder and scratch experienced in this step.

To solve such problems, there has been proposed a method comprising adding alumina particles having a specific crystal form to decrease damages to the film (e.g., Japanese Patent Examined Publication No. 4-40375). This method provides sufficient improvement in scratch resistance, but when a polyester film containing said alumina particles is run under heating, the amount of the white powder adhering to the metallic pin increases. Therefore, for example, when the running speed of the film is increased in a calendering step in which the film is subject to heat histeresis, the amount of the white powder increases. In addition, the high hardness of alumina causes problems when used with a high pressure homogeneous dispersion machine or media dispersion type wet grinder for the preparation of alumina slurry, since it wears SUS which constitutes these apparatuses and SUS may be mixed in the slurry as a contaminant component. Along therewith, parts replacement frequency would become higher. In a polyester polymerization system including alumina fine particles, moreover, the products of degraded polyester, which are adhered to or deposited in a kettle, particularly at the vicinity of gas-liquid interface, are scraped by the alumina fine particles and contained in the polyester as bulky products.

Another method includes addition of spherical monodispersed silica obtained by removing alkali from sodium silicate or hydrolysis of alkoxysilane. This method shows a certain degree of improvement in scratch resistance under high film running speeds. However, the particles themselves tend to come off from the film and resistance to scraping of the film is degraded. The particles once fell are prone to form aggromerates, and the scraped matter including the aggromerates of the fallen particles gives damages to the magnetic surface, thus increasing the number of drop outs.

Faced with the need to increase feeding speed at the slitting step, the conventional problems such as chips from the film and build-up of the cut surfaces at slitting are desired to be solved, whereby to provide a film with less friction with a slitting blade and superior in continuous slitting.

SUMMARY OF THE INVENTION

It is therefore an object of the present invention to solve the problems caused by the increased speed at a magnetic tape production step and a cassette housing step, and provide an oriented polyester film having high quality, which is superior in slipping property, slitting property, resistance to scraping, scratch resistance and winding property.

According to the present invention, there is provided a biaxially oriented polyester film comprising silica particles (A) having an average secondary particle size of 50–200 nm, an average primary particle size ratio (length/breadth) of 1.25–3.0, and a ratio of average primary particle size/standard deviation of primary particle size (d/σ) of 0.5–5.0 in a proportion of 0.01–1% by weight, and inactive particles (B) having an average particle size of 300–1500 nm in a proportion of 0.01–1% by weight.

The more preferable embodiments of the present invention are the above-mentioned biaxially oriented polyester film wherein the silica particles (A) have a specific surface area of 30–80 m$^2$/g; the film wherein the silica particles (A) contain chroline atom in a proportion of 10–500 ppm; the film wherein the inactive particle (B) is at least one kind from synthetic calcium carbonate particles and heat-resistant organic polymer particles; the film wherein the inactive particles (B) have an area proportion of not less than 60% relative to the circumscribed circle; the film wherein the inactive particles (B) have a particle dispersion of not more than 50%; the film wherein the inactive particles (B) comprise inactive particles (B1) having an average particle size of 300–650 nm in a proportion of 0.05–0.5% by weight and inactive particles (B2) having an average particle size of 750–1300 nm in a proportion of 0.01–0.25% by weight; the film wherein the difference in average particle size between the inactive particles (B2) and inactive particles (B1) is 200–600 nm; and the film having a limiting viscosity number (intrinsic viscosity) of 0.5–0.6.

In still other embodiments of the present invention, there are provided an oriented polyester film comprising silica particles (a) synthesized by flame hydrolysis of silicon tetrachloride, and having a specific surface area of 30–80 $m^2/g$ and an average particle size of 50–200 nm, in a proportion of not less than 0.01% by weight and less than 0.5% by weight, synthetic calcium carbonate particles (b) having an average particle size of 300–650 nm, in a proportion of 0.05–0.5% by weight, and synthetic calcium carbonate particles (c) having an average particle size of 750–1300 nm, in a proportion of 0.01–0.25% by weight; the film wherein both particles (b) and particles (c) have an area ratio of not less than 60% relative to the circumscribed circle; the film wherein the difference in the average particle size between particles (b) and particles (c) is 200–600 nm; and the film having a specific viscosity of 0.5–0.6.

DETAILED DESCRIPTION OF THE INVENTION

Figure 1:
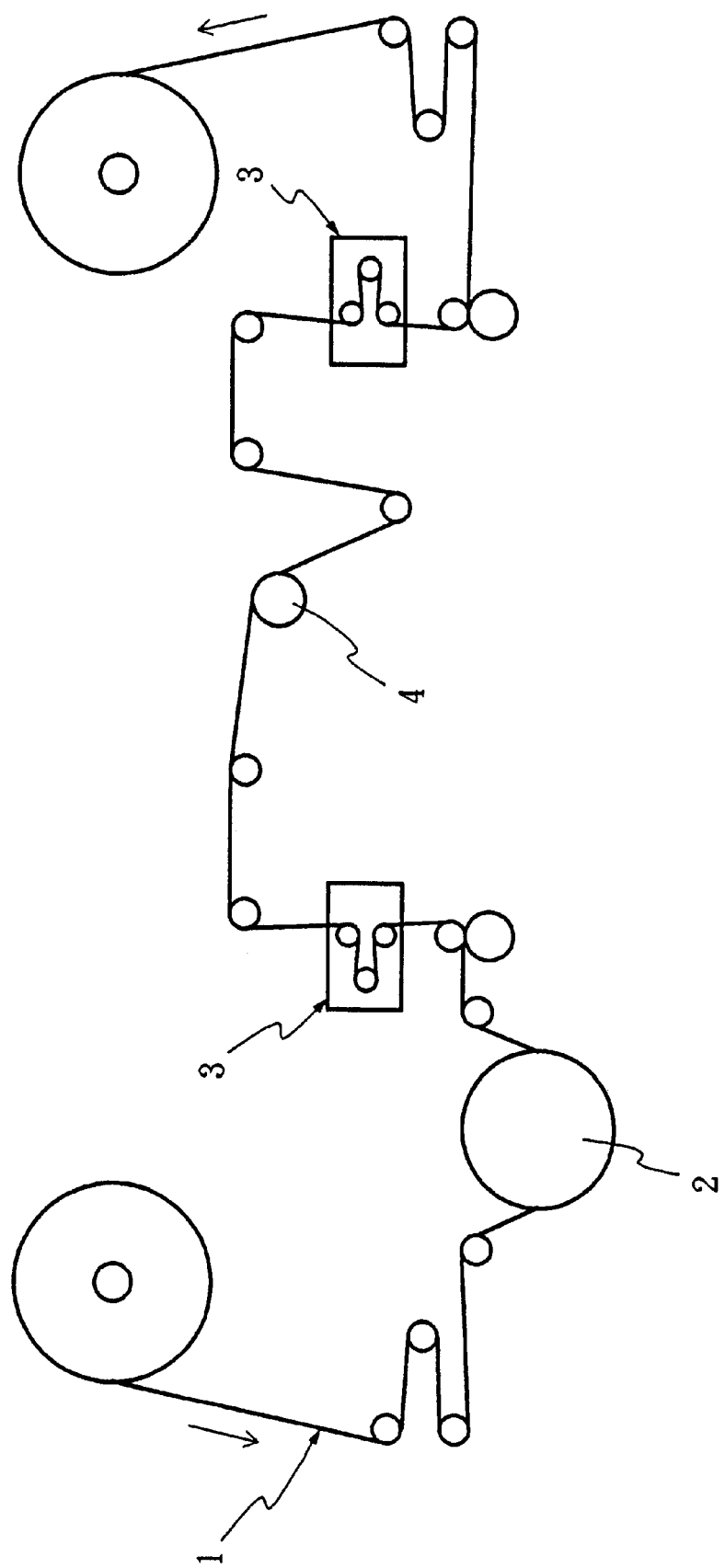
FIG. 1 is a schematic showing of a running tester to evaluate resistance to scraping and scratch resistance, wherein 1 is a film, 2 is a capstan, 3 is a tension detector and 4 is a guide pin.

The polyester to be used in the present invention is preferably a crystalline polyester such as those comprising, as the main repeating unit, ethylene terephthalate comprising terephthalic acid and ethylene glycol, ethylene naphthalate comprising 2,6-naphthalene dicarboxylic acid and ethylene glycol, and the like. Those comprising 80% by mole or more of the ethylene terephthalate or ethylene naphthalate repeating units are particularly preferable.

Examples of the copolymerization component other than the above-mentioned components (terephthalic acid, 2,6-naphthalene dicarboxylic acid and ethylene glycol) in the above-mentioned polyester include dicarboxylic acid components such as isophthalic acid, p-β-oxyethoxybenzoic acid, 4,4'-dicarboxydiphenol, 4,4'-dicarboxy-benzophenone, bis-(4-carboxylphenyl)ethane, adipic acid, sebasic acid, sodium 5-sulfoisophthalate and cyclohexane-1,4-dicarboxylic acid; glycol components such as propylene glycol, butandiol, neopentyl glycol, diethylene glycol, cyclohexane dimethanol, addition product of ethylene oxide with bisphenol A, polyethylene glycol, polypropylene glycol and polytetramethylene glycol; and oxycarboxylic acid components such as p-oxybenzoic acid, which can be selected optionally.

A small amount of a compound having an amide bond, urethane bond, ether bond, carbonate bond and the like may be copolymerized as a copolymerization component.

The polyester itself is known per se and can be produced by a known method such as condensation of an ester oligomer obtained by direct esterification or interesterification.

Setting a limiting viscosity number of the polyester film to 0.50–0.60 is a preferable means for improving resistance to scraping, scratch resistance and slitting property of the film. As used herein, by the limiting viscosity number is meant that determined by dissolving the polyester film in a mixed solvent of phenol/tetrachloro ethane (weight ratio:3/2) and measuring at 30° C. The limiting viscosity number of said polyester film is more preferably 0.52–0.58, and most preferably 0.54–0.56. The limiting viscosity number of the polyester film in this range can be achieved by setting the limiting viscosity number of polyester polymer to a level 0.01–0.02 higher than that of the film.

The silica particles (A) used in the present invention should have an average particle size of 50–200 nm of secondary particles according to the sedimentation method (the particle size corresponding to 50% by weight in a cumulative curve which is drawn based on various particle sizes and the amount of the existing particles, said particle sizes being calculated from the centrifugal sedimentation curve obtained by the sedimentation method based on the Stokes' law of resistance), an average primary particle size ratio [average value of (length of primary particles/breadth of primary particles)] of 1.25–3 and a ratio of average primary particle size/standard deviation of primary particle size (d/σ) of 0.5–5.

The length and breadth of the primary particles used for determining the "average primary particle size ratio" are determined by the following method. That is, the maximum length (absolute maximum length) between two optional points on the periphery of the images of the primary particles is taken as the length and the distance (width) perpendicular thereto is taken as the breadth. The diameter (d) of the primary particle when determining "d/σ" is the diameter equivalent to that of the projected area circle (Heywood diameter). The standard deviation (σ) of the primary particle size is that of the diameter equivalent to the projected area circle diameter of the primary particles. The length, breadth and average diameter of primary particles of the above-mentioned silica particles (A) are determined by a microscopic method. That is, 3,000–5,000 particles are subjected to image analysis using a scanning electron microscope at a magnification of 10,000–50,000.

The silica particles (A) to be used in the present invention are not subject to any particular limitation with regard to the production method, as long as they have the above-mentioned characteristics. For example, hydrolysis of silicon tetrachloride with oxyhydrogen flame (flame hydrolysis) may be used.

According to the flame hydrolysis, the silica particles satisfying the above-mentioned requirements can be suitably obtained when the reaction conditions are adjusted to make the chlorine content in silica particles (A) 10–500 ppm. When the chlorine content in the silica particles (A) is 10–500 ppm, SUS tanks and lines for preparing slurry and polyester polymerization reaction are free of corrosion and the dispersibility of the particles in polyester becomes fine.

The silica particles (A) to be used in the present invention preferably contain silica in a proportion exceeding 99.8% by weight of the particles (A) and preferably contain alumina in a proportion of less than 0.08% by weight. When the alumina content in the silica particles is not less than 0.08% by weight, particularly not less than 0.2% by weight, carboxylic acid salt is produced when the silica particles are added to the polyester polymerization system to clog the filter.

The average secondary particle size of the silica particles (A) needs to be 50–200 nm, preferably 60–180 nm and particularly preferably 70–150 nm. When said average secondary particle size is less than 50 nm, the particles become too fine and cannot form fine protrusions necessary for an improved scratch resistance and resistance to scraping of the film, whereas that greater than 200 nm reduces resistance to scraping.

The average primary particle size ratio (length/breadth) of silica particles (A) needs to be 1.25–3.0, preferably 1.27–2.5 and particularly preferably 1.3–2.0. When said average primary particle size ratio is less than 1.25 or when the particles are near complete round, the particles do not show stress relaxation in the stretching direction of the film, as a result of which voids are formed around the particles. When a shear force is applied to the protrusions on the film surface by roll, guide and the like, the particles tend to easily drop and the dropped particles form aggromerates which degrade resistance to scraping of the film. When the average primary particle size ratio exceeds 3.0, the scratch resistance under high speed operation becomes insufficient.

In addition, the ratio of average primary particle size/standard deviation of primary particle size (d/σ) of the silica particles (A) needs to be 0.5–5.0. This parameter shows the dispersion of the particle size distribution of the primary particles wherein smaller figures show broader size distribution. When silica particles having d/σ of 0.5–5.0 are used, slitting property, in particular, continuous slitting property can be improved. As a result, occurrence of chips from cut surfaces of the film becomes extremely less even without replacement of a slitting blade for a long time, and build-up of cut surfaces becomes less. The d/σ is preferably 1.0–4.0 and particularly preferably 1.2–3.0. When d/σ is less than 0.5, the particle size distribution becomes too broad and an increase in the amount of bulky particles deteriorates the resistance to scraping of the film. When the particles have d/σ exceeding 5.0 and a particle size which is almost uniform, the slitting property becomes insufficient.

The silica particles (A) need to be contained in a proportion of 0.01–1% by weight, preferably 0.1–0.5% by weight, of the polyester film. When it is contained in a proportion of less than 0.01% by weight, the improvement in scratch resistance and slitting property becomes insufficient, whereas when it is contained in a proportion of more than 1% by weight, the particles overlap to cause degraded resistance to scraping.

When the specific surface area of silica particles (A) by the BET method is 30–80 $m^2/g$, resistance to scraping, scratch resistance and slitting property become fine. Said specific surface area is more preferably 35–75 $m^2/g$, particularly preferably 40–70 $m^2/g$. The specific surface area by the BET method is obtained by drawing a so-called "isothermal line" showing the relationship between the pressure and the amount of nitrogen gas physically adsorbed to a powder at a liquid nitrogen temperature, according to the constant volume method used for measuring the amount of an adsorbed gas from the changes in pressure which are caused by the adsorption in a certain volume of the gas, and determining according to the BET method based on the adsorbed amount of nitrogen gas according to the lower pressure side of the isothermal line.

The film of the present invention needs to contain, along with silica particles (A), inactive particles (B) having an average particle size by the above-mentioned sedimentation method of 300–1500 nm in a proportion of 0.01–1% by weight of the polyester film. When silica particles (A) are used alone, the coefficient of friction to various guides becomes high, and scratch resistance, resistance to scraping and winding property are degraded. As a result, the yield of the product becomes extremely poor at the slitting step in the film production and magnetic tape production. When the obtained tape is used as a magnetic recording medium, the runnability of the film becomes poor.

The average particle size of the inactive particles (B) needs to be 300–1500 nm. When said average particle size is less than 300 nm, the winding property-improving effect becomes insufficient. When it exceeds 1500 nm, the flatness of the film surface becomes insufficient to cause low resistance to scraping. When a video tape is produced from such a film, electromagnetic conversion performance may become poor or particles may frequently fall off.

The content of the inactive particles (B) needs to be 0.01–1% by weight relative to the polyester film. When the content of the particles (B) is less than 0.01% by weight, the winding property and resistance to scraping become insufficient. When the content of particles (B) exceeds 1% by weight, slipping property becomes insufficient to cause poor resistance to scraping. An increase in the speed at the slitting step causes too much slipping of the film to produce displacement of the ends, thus hindering smooth winding of the film.

Examples of the inactive particles (B) include synthetic calcium carbonate particles, heat-resistant organic polymer particles, spherical silica particles, kaoline particles, zeolite particles, calcium phosphate particles and titanium oxide particles. The use of at least one member selected from synthetic calcium carbonate particles and heat-resistant organic polymer particles is particularly preferable in view of the winding property, resistance to scraping and runnability of the film.

The synthetic calcium carbonate particles are preferably produced by a method disclosed in, for example, Japanese Patent Unexamined Publication No. 5-117443 and Japanese Patent Unexamined Publication No. 6-1908, which includes blowing a carbonate gas into an aqueous suspension of calcium hydroxide for synthesis.

The heat-resistant organic polymer particles have a thermal decomposition temperature at 10% reduction in weight of not less than 360° C., preferably not less than 380° C. Examples of such heat-resistant organic polymer particles include crosslinked polystyrene particles, silicon resin particles, polyimide particles and PTFE resin [poly (tetrafluoroethylene)] particles. Preferable examples of the crosslinked polystyrene particles satisfying the above-mentioned heat resistance include those obtained by the production method described in Japanese Patent Unexamined Publication No. 7-238105.

When inactive particles (B1) having an average particle size of 300–650 nm are contained in a proportion of 0.05–0.5% by weight of the polyester film and inactive particles (B2) having an average particle size of 750–1300 mn are contained in a proportion of 0.01–0.25% by weight of the polyester film, as inactive particles (B), resistance to scraping and slipping property can be improved, and winding property under high speed operation can be enhanced.

The average particle size of the inactive particles (B1) is more preferably 350–600 nm and particularly preferably 400–550 nm. The content thereof is preferably 0.08–0.45% by weight and particularly preferably 0.15–0.40% by weight of the polyester film. The average particle size of the inactive particles (B2) is preferably 800–1200 nm and particularly preferably 850–1100 nm. The content thereof is preferably 0.03–0.20% by weight, particularly preferably 0.05–0.15% by weight of the polyester film.

The difference in average particle size between the inactive particles (B2) and inactive particles (B1) is preferably 200–600 nm and particularly preferably 300–500 nm in consideration of the improvement in winding property under the conditions including high speed delivery of the film.

The shape of the inactive particles (B) is preferably near lump, cubic or spherical in view of winding property and runnability. More specifically, the particles preferably have an area ratio relative to the circumscribed circle which is defined by the following formula (I) of the particles of not less than 60%, particularly preferably not less than 70% for an improved resistance to scraping, slipping property and winding property.

$$\text{Percentage of the area relative to circumscribed circle (\%)} = \frac{\text{average projected cross-sectional area of particles}}{\text{average area of circumscribed circle of the particles}} \times 100$$

The particle size of the inactive particles (B) is preferably near uniform to achieve superior resistance to scraping and to avoid disadvantageous growth of bulky protrusions formed by the bulky particles. Specifically, it is preferable that the dispersion in particle size as defined by the following formula (II) be not more than 50%, more preferably not more than 30%.

$$\text{Dispersion in particle size (\%)} = \frac{\text{standard deviation of Feret's diameter in the horizontal direction}}{\text{average Feret's diameter in the horizontal direction}} \quad (II)$$

When synthetic calcium carbonate particles are used as inactive particles (B), it is preferable to treat the surface of the synthetic calcium carbonate particles with, for example, a compound such as polyether acrylic copolymer salt described in Japanese Patent Unexamined Publication No. 2-178333, for an improved affinity of polyester for the synthetic calcium carbonate particles.

The silica particles (A) and inactive particles (B) are preferably added to the polyester polymerization system after dispersing them into a slurry state, particularly preferably as a slurry of ethylene glycol, for the prevention of drifting of the particles and in terms of precision of provision and dispersibility of the particles. The concentration of the particles in the slurry is suitably 5–20% by weight.

When dispersing into a slurry state, a known dispersing method (e.g., high pressure homogeneous dispersion method, media dispersion method and ultrasonic dispersion method), centrifugation, filtration and the like can be used for decreasing the occurrence of bulky protrusions on the film surface, with preference given to a combined use of these methods.

When silica particles (A) and inactive particles (B) are dispersed into a glycol slurry, a dispersing agent such as phosphorus-containing compounds (e.g., sodium hexamethaphosphate, sodium polyphosphate and ammonium phosphate), nitrogen atom-containing compounds (e.g., tetraethylammonium hydroxide, hydroxylamine and ammonium salt of acrylic copolymer), and alkaline aqueous solutions containing sodium ion, potassium ion and the like, is used to improve dispersibility of the particles in slurry and polymer. That is, the addition of such dispersing agent generates charge on the particle surfaces, whereby the dispersibility of the particles in the slurry and polymer is improved to suppress occurrence of bulky particles which cause drop out and the like.

The addition of the slurry containing silica particles (A) and inactive particles (B) other than silica to the polyester differs between silica particles (A) and inactive particles (B). In the case of inactive particles (B) other than spherical silica, the slurry is particularly preferably added after interesterification or esterification and before the completion of initial condensation polymerization, in view of dispersibility of the particles. By the completion of initial condensation polymerization is meant the time when the limiting viscosity number of the reaction system has reached about 0.2. After this point, the viscosity of the reaction system becomes too high, so that the added components cannot be mixed homogeneously and homogeneous products cannot be obtained. In addition, depolymerization of oligomer occurs to cause low productivity, and the amount of the by-product, diethylene glycol (DEG), increases. In case of silica particles (A) and spherical silica as the inactive particles (B), the addition before interesterification or esterification is preferable in view of dispersibility of the particles. In particular, the addition before the temperature in the reaction vessel reaches 100° C. is preferable, by which dispersibility of the particles in polymer can be increased.

Moreover, addition of a compound containing a metallic atom of the second group of the periodic system and a phosphorus compound in predetermined amounts to the film leads to an improved dispersibility in the polyester and a decreased melt resistivity of the polyester. To be specific, the molar ratio of P atom in the phosphorus compound to the metallic atom in the compound containing a metallic atom of group II of the periodic table, i.e., p/metallic atom, is preferably 0.5–1.0, more preferably 0.65–0.90. When the content of the P atom in the phosphorus compound is adjusted to 10–2000 ppm, the particles show better dispersibility in the polyester and a polyester having a melt resistivity of not more than $0.5 \times 10^8 \Omega \cdot cm$ can be obtained. When the melt resistivity of the polyester is decreased, the adhesion of the polyester sheet melt-extruded from a die to a cooling drum by the electrostatic application casting method can be improved when they are adhered to each other, which in turn enables increase of the speed of rotation cooling drum without generating bound gas foams called pinner bubbles, whereby the productivity of the film can be improved.

Examples of the compound containing a metallic atom of group II of the periodic table include magnesium acetate and calcium acetate. Examples of phosphorus compound include phosphoric acid, triester of phosphoric acid, acidic phosphate, phosphorous acid and phosphorous ester.

As an alternative method for adding silica particles (A) and inactive particles (B) to a polyester polymerization system, there is exemplified a method comprising producing master chips containing particles (A) and (B) at high concentrations and mixing or diluting same as appropriate with master chips or polyester (bright resin) without particles to adjust the mixture to the necessary particle concentrations.

The film of the present invention may be composed of a single layer or a laminate film comprising three layers of i/ii/i using a recycled intermediate layer (ii layer), as long as the surface layer (i layer) of the film is the film of the present invention. Such laminate film is preferable for reducing the production cost.

Furthermore, a coating agent containing an aqueous polymer described in Japanese Patent Unexamined Publication No. 4-253738 as a film-forming component, may be applied to one surface of the film of the present invention for better adhesion of the film to a magnetic layer.

The polyester film of the present invention is obtained by, for example, extruding a polyester at a temperature of from melting temperature Tm° C. of polyester to (Tm+70)° C., preferably at a temperature not higher than (Tm+50)° C., forming an unstretched film by the electrostatic application cooling method, uniaxially (longitudinal direction or transverse direction) stretching said unstretched film 2.5–5.0 times at a temperature of from (Tg−10)° C. to (Tg+70)° C. wherein Tg is a glass transition temperature of polyester, and stretching 2.5–5.0 times in the direction perpendicular to the above-mentioned stretching direction (when the first stretching is done in the longitudinal direction, the second stretching is done in the transverse direction) at a temperature of from Tg° C. to (Tg+70)° C. In this case, area draw ratio is 9–22, preferably 12–22. The drawing may be simultaneous biaxial drawing or successive biaxial drawing.

The obtained film may be thermally cured at a temperature of from (Tg+70)° C. to Tm° C. For example, a polyethylene terephthalate film is preferably thermally cured at 190–230° C. for, for example, 1–60 seconds.

With regard to the film containing the particles (a), (b) and (c), the parameters and production of particles, and the properties and production of the film are in accord with those of the above-mentioned film containing particles (A) and (B).

The present invention is described in the following Examples and Comparative Examples, to which the present invention is not limited. Unless otherwise specified, "parts" in Examples and Comparative Examples means "parts by weight". The properties referred to in Examples and Comparative Examples are measured by the following methods.

(1) Average primary particle size ratio (length/breadth), average primary particle size (d) and standard deviation ($\sigma$) of primary particle size of silica particles (A)

The powdery silica particles (A) are fixed on a sample table for a scanning electron microscope, subjected to platinum sputtering, observed in a scanning electron microscope at magnification of 10,000–50,000, subjected to image analysis (3,000–5,000 particles) using NIRECO LUZEX 2D and determined for average primary particle size ratio (length/breadth), average primary particle size (d) and standard deviation ($\sigma$) of primary particle size.

When calculated from the film, a small film sample piece is fixed on a sample table for a scanning electron microscope and subjected to ion etching of the film surface using a sputtering apparatus (JFC-1100 type ion etching apparatus, manufactured by JAPAN ELECTRONICS CO., LTD., under the following conditions. That is, the sample is placed in a bell-jar, the degree of vacuum is raised to about $10^{-3}$ Torr of vacuo and ion etching is applied at voltage 0.25 kV, current 1.25 mA for about 10 minutes. Using said apparatus, the film is subjected to platinum sputtering, observed in a scanning electron microscope at a magnification of 10,000–50,000 to determine the observation site excluding inactive particles (B) from the view, and subjected to image analysis (3,000–5,000 particles) using NIRECO LUZEX 2D, based on which the parameters are determined.

(2) Average particle size of secondary particles of silica particles (A) and average particle size of inactive particles (B)

The inactive particles (B) are diluted with ethylene glycol and determined for size distribution using light transmitting centrifugal sedimentation type size distribution determining machine (SA-CP3 type, manufactured by Shimazu Seisakusho).

In the case of the secondary particles of silica particles (A), an ethylene glycol slurry is diluted with water to the ratio of 1:9 (ethylene glycol slurry:water, volume ratio) and further diluted as necessary with a mixture of ethylene glycol and water (ethylene glycol:water=1:9, volume ratio). The particle size corresponding to 50% by weight which is determined from the curve of cumulation of the particles of various particle sizes and the amount of existing particles, which are calculated from the centrifugal sedimentation curve obtained by the sedimentation method based on the Stokes' law of resistance using the samples thus obtained, is taken as the average particle size of secondary particles of silica particles (A) and average particle size of inactive particles (B).

(3) Specific surface area of silica particles (A)

Using AUTOSORB-1 manufactured by QUANTACHROME, specific surface area is determined by the BET method.

(4) Area proportion of the particles relative to circumscribed circle

The projected cross-sectional area ($\mu m^2$) of each particle and the area ($\mu m^2$) of the circle circumscribing each particle are determined using an image analyzer (NIRECO LUZEX 2D) from the photographs taken on observation of at least 100 particles in a scanning electron microscope (Hitachi S-510 type), and the average values are taken as the ratio (%) of the area of the particles relative to the circumscribed circle.

$$\text{Area proportion (\%) relative to circumscribed circle} = \frac{\text{average projected cross-sectional area of particles}}{\text{average area of the circle circumscribing particles}} \times 100$$

(5) Dispersion in particle size

The Feret's diameter in the horizontal direction of at least 100 inactive particles (B) is measured using the apparatus used in (4). The dispersion in particle size is defined by the following formula (II):

$$\text{Dispersion in particle size (\%)} = \frac{\text{standard deviation of Feret's diameter in the horizontal direction}}{\text{average Feret's diameter in the horizontal direction}} \quad (II)$$

(6) Flatness of the film surface

The film surface is determined using a three-dimensional surface roughness tracer (SE-3AK, manufactured by KOSAKA LABORATORY Ltd.) at stylus tip radius 2 $\mu$m, load 30 mg in the lengthwise direction of the film at cut off value 0.25 mm for a measurement length of 1 mm, and the data in the height direction every 2 $\mu$m is read on an external recorder at a quantization width of 0.00312 $\mu$m. This determination is performed in the crosswise direction of the film at 2 $\mu$m intervals for consecutive 150 times, namely, over the 0.3 mm width in the crosswise direction of the film. The three-dimensional center line average height (SRa:nm) as determined under these conditions is taken as the flatness of the film surface. ps (7) Coefficient of friction According to ASTh D-1894-63 and using a sledding slip tester, a film/film coefficient of dynamic friction ($\mu$d) is determined under the environment of 23° C., 65% RH.

(8) Winding property on slitter

The winding state (wrinkles and disturbance in winding) when the film is wound at a slitting step is evaluated as follows.

<Evaluation of winding state>

⊚: no wrinkles or disturbance in winding at a film winding speed of 500 m/min

○: wrinkles or disturbance in winding to some extent at a film winding speed of 500 m/min but no wrinkles or disturbance in winding at a reduced film winding speed of 400 m/min x: wrinkles or disturbance in winding to some extent at a film winding speed of 400 m/min but no wrinkles or disturbance in winding at a reduced film winding speed of 350 m/min xx: occurrence of wrinkles and disturbance in winding at a reduced film winding speed of 350 m/min (9) Resistance to scraping Using the film running tester shown in FIG. 1, resistance to scraping is evaluated. In FIG. 1, 1 is a film, 2 is a capstan, 3 is a tension detector and 4 is a guide pin (guide pin for commercially available VTR, maximum protrusion height of 0.15 μm and center line average height of 0.008 μm as determined by a surface roughness tracer).

A polyester film heat-treated in a hot air drier at 130° C. for one hour and slit in a ½ inch width is cooled to a normal temperature (23° C.) in an atmosphere of 23° C., 65% RH. Then, the film is brought into contact with the guide pin 4 in an atmosphere of 23° C., 65% RH at an angle of 135° while being run on a tension of 50 g and at a rate of 200 cm/min for 90 m. After the running, the amount of a white powder adhered to the surface of the guide pin 4 is observed in a microscope, based on which the film is evaluated as follows.

⊚: absence of adhesion of white powder or partial adhesion of a small amount of the powder, if any ○: thin adhesion of a small amount of white powder x: partial adhesion of a large amount of white powder xx: adhesion of a large amount of white powder in the entirety Those rated ⊚ or ○ find no practical problem.

(10) Scratch resistance

Using the running tester of FIG. 1 as used in the test for resistance to scraping, a polyester film without heat-treatment which has been slit in a ½ inch width is brought into contact with an insufficiently finished guide pin having a center line average height of 0.15 μm which is obtained by bending an SUS sintered plate into a columnar shape, instead of the guide pin 4 for commercially available VTR used in the test for resistance to scraping, at an angle of 90° in an atmosphere of 23° C., 65% RH while being run on a tension of 100 g at a rate of 127 cm/min for 90 meters. After the running, the film is evaporated with an aluminum and the whole width of the film is observed in a microscope while lighting the film from the diagonal direction, based on which the number of scratches on the film surface is evaluated as follows. Shallow scratches and discontinuous scratches are also counted.

<Evaluation of number of scratches>

⊚: not more than 10/whole width

○: 11–30/whole width x: 31–60/whole width xx: not less than 61/whole width

(11) Slitting property

A polyester film is slit with a shear cutter in a ½ inch width for 1,000 m and the slit part of the film is visually observed. Occurrence of beard and powder is evaluated as follows.

<Evaluation of slitting property>

⊚: extremely small amount of beard and powder

○: small amount of beard and powder

Δ: medium amount of beard and powder x: somewhat greater amount of beard and powder xx: greater amount of beard and powder Most biaxially oriented polyester films for commercially available videotapes have the slitting property graded as Δ or x.

EXAMPLE 1

A polyester containing silica particles (A) was obtained by the following method.

Terephthalic acid (86.4 parts) and ethylene glycol (64.4 parts) were charged in an esterification reaction vessel while cooling the vessel, and antimony trioxide (0.03 part) as a catalyst and magnesium acetate 4 hydrate (0.088 part) and triethylamine (0.16 part) were charged with stirring, which was followed by standing the reaction vessel until it cooled to 80° C.

Silica particles (A) obtained by flame hydrolysis of silicon tetrachloride, which have an average primary particle size ratio (length/breadth) of 1.35, the ratio of average primary particle size/standard deviation of primary particle size of 2.5, BET specific surface area of 50 $m^2/g$ and chroline content of 50 ppm were mixed with ethylene glycol, which was subjected to wet grinding, centrifugation and filtration to give an ethylene glycol slurry of silica particles (A) having an average secondary particle size of 110 nm.

After the temperature in the esterification reaction vessel reached 80° C., the above-mentioned slurry (particle content: 2.0 parts per polymer product 100 parts) was added to the esterification reaction vessel. Five minutes later, the pressure and temperature were raised to carry out pressurization esterification at gauge pressure of 3.5 $kg/cm^2$ and at 240° C. Then, the esterification reaction vessel was depressurized to the normal pressure and trimethyl phosphate (0.033 part) was added. Five minutes after the addition of trimethyl phosphate, the esterification reaction product was transferred to a condensation polymerization vessel and subjected to condensation polymerization under reduced pressure at 280° C. to give a polyester having a limiting viscosity number of 0.58, which was used as polyester (A).

A polyester containing inactive particles (B1) and a polyester containing inactive particles (B2) were obtained by the following method.

An esterification reaction vessel was heated and when it reached 200° C., terephthalic acid (86.4 parts) and ethylene glycol (64.4 parts) were charged therein, and antimony trioxide (0.03 part) as a catalyst and magnesium acetate 4 hydrate (0.088 part) and triethylamine (0.16 part) were added with stirring. Then, the pressure and temperature were raised to carry out pressurization esterification at gauge pressure of 3.5 $kg/cm^2$ and at 240° C. Then, the esterification reaction vessel was depressurized to the normal pressure and trimethyl phosphate (0.040 part) was added. The reaction vessel was heated to 260° C., and 15 minutes after the addition of trimethyl phosphate, the reaction mixture was subjected to centrifugation. An ethylene glycol slurry of synthetic calcite type calcium carbonate particles (B1) (particle content: 2.0 parts per polymer product 100 parts) having an area proportion of 80% relative to the circumscribed circle, a particle size dispersion of 28% and an average particle size of 510 nm, and containing, as a dispersing agent, an aqueous solution of sodium tripolyphosphate, such that Na atom was contained in a proportion of 0.1% by weight of calcium carbonate. Fifteen minutes later, the obtained esterification reaction product was transferred to a condensation polymerization vessel and subjected to condensation polymerization under reduced pressure at 280° C. to give a polyester having a limiting viscosity number of 0.58, which was used as polyester (B1).

In the same manner as in the production of polyester (B1) except that a slurry containing synthetic calcite type calcium carbonate particles (B2) having an area proportion of 75% relative to the circumscribed circle, a particle size dispersion of 25% and an average particle size of 890 nm (particle content: 2.0 parts relative to polymer product 100 parts) instead of synthetic calcite type calcium carbonate particles (B1) having an average particle size of 510 nm, a polyester having a limiting viscosity number of 0.58 was obtained. This was used as polyester (B2).

In the same manner as in the production of polyester (B1) except that synthetic calcite type calcium carbonate particles (B1) having an average particle size of 510 nm were not added, a polyester having a limiting viscosity number of 0.58 and containing no silica particles or inactive particles was obtained. This was used as polyester (C).

The polyesters (A), (B1), (B2) and (C) were mixed in a weight ratio of 20:10:3.75:66.25 and the mixture was dried and melt-extruded at 290° C. The obtained unstretched sheet was adhered to a cooling drum by the electrostatic application casting method, and drawn 3.6 times in the longitudinal direction at 90° C. and 3.7 times in the transverse direction at 110° C., which was followed by heat treatment at 220° C. to give a 14.5 μm thick biaxially oriented polyester film having a limiting viscosity number of 0.56.

COMPARATIVE EXAMPLE 1

In the same manner as in Example 1 except that polyester (A) was not used and the polyesters (B1), (B2) and (C) were mixed in a weight ratio of 10:3.75:86.25, a film having the same thickness and limiting viscosity number with the film of Example 1 was obtained.

COMPARATIVE EXAMPLE 2

In the same manner as in Example 1 except that polyesters (A), (B1), (B2) and (C) were mixed in a weight ratio of 70:10:3.75:16.25, a film having the same thickness and limiting viscosity number with the film of Example 1 was obtained. The film of this Comparative Example 2 contained silica particles (A) in a proportion of 1.4% by weight.

COMPARATIVE EXAMPLE 3

The silica particles were synthesized by subjecting silicon tetrachloride of silica particles (A) as used in Example 1 to the flame hydrolysis under different reaction conditions. That is, silica particles having an average primary particle size ratio (length/breadth) of 1.30, a ratio of average primary particle size/standard deviation of primary particle size of 6.0, BET specific surface area of 200 m$^2$/g and chroline content of 30 ppm were mixed with ethylene glycol, and the obtained slurry was subjected to wet grinding, centrifugation and filtration to give an ethylene glycol slurry containing silica particles having an average secondary particle size of 110 nm. In the same manner as in Example 1 except that this slurry was used instead of silica particles (A) used in Example 1, polyester (A2) was obtained.

In the same manner as in the production of polyester (a) of Example 1 except that polyester (A2) was used instead of polyester (A), a film having the same thickness and limiting viscosity number with the film of Example 1 was obtained.

COMPARATIVE EXAMPLE 4

In the same manner as in Example 1 except that spherical monodispersed colloidal silica particles obtained using sodium silicate as a starting material and by removing alkali (sodium) component in a wet system, which have an average particle size of 110 nm, an average primary particle size ratio (length/breadth) of 1.05, a ratio of average primary particle size/standard deviation of primary particle size of 20, BET specific surface area of 30 m$^2$/g and chroline content of less than 1 ppm were used instead of the silica particles (A) used in Example 1, polyester (A3) was obtained.

In the same manner as in Example 1 except that polyester (A3) was used instead of polyester (A), a film having the same limiting viscosity number and thickness with the film obtained in Example 1 was obtained.

COMPARATIVE EXAMPLE 5

In the same manner as in the production of polyester (A) in Example 1 except that spherical colloidal silica particles having an average particle size after mixing of 80 nm, a ratio of average primary particle size/standard deviation of primary particle size of 2.5 and BET specific surface area of 50 m$^2$/g which were obtained by mixing five kinds of spherical monodispersed colloidal silica particles produced using sodium silicate as a starting material, by removing alkali (sodium) component in a wet system, which had an average primary particle size ratio (length/breadth) of 1.05, chlorine content of less than 1 ppm and an average particle size of 30 nm, 50 nm, 80 nm, 110 nm or 140 nm, were used instead of the silica particles (A) used in Example 1, polyester (A4) was obtained.

In the same manner as in Example 1 except that polyester (A4) was used instead of polyester (A), a film having the same limiting viscosity number and thickness with the film obtained in Example 1 was obtained.

COMPARATIVE EXAMPLE 6

In the same manner as in the production of polyester (A) in Example 1 except that silica particles (A) synthesized by flame hydrolysis of silicon tetrachloride as described in Example 1 were mixed with ethylene glycol (average secondary particle size of silica particles: 250 nm) and this slurry was added to an esterification reaction vessel without wet grinding, centrifugation and filtration, polyester (A5) was obtained.

In the same manner as in Example 1 except that polyester (A5) was used instead of polyester (A), a film having the same limiting viscosity number and thickness with the film obtained in Example 1 was obtained.

EXAMPLE 2

In the same manner as in the production of polyester (B1) in Example 1 except that synthetic calcite type calcium carbonate particles (B1a) having an area proportion of 80% relative to the circumscribed circle, a particle size dispersion of 27% and an average particle size of 420 nm were used instead of synthetic calcium carbonate particles having an average particle size of 510 nm contained in the polyester (B1) used in Example 1, polyester (B1a) was obtained.

In the same manner as in the production of polyester (B2) in Example 1 except that synthetic calcite type calcium carbonate particles (B2) having an area proportion of 80% relative to the circumscribed circle, a particle size dispersion of 23% and an average particle size of 790 nm were used instead of synthetic calcium carbonate particles having an average particle size of 890 nm contained in the polyester (B2) used in Example 1, polyester (B2a) was obtained.

In the same manner as in Example 1 except that polyesters (A), (B1a), (B2a) and (C) were mixed in a weight ratio of 15:15:5:65, a film having the same limiting viscosity number and thickness with the film obtained in Example 1 was obtained.

COMPARATIVE EXAMPLE 7

In the same manner as in Example 2 except that polyesters (A), (B1a), (B2a) and (C) were mixed in a weight ratio of 15:60:5:20, a film having the same limiting viscosity number and thickness with the film obtained in Example 2 was obtained.

COMPARATIVE EXAMPLE 8

In the same manner as in the production of polyester (B1a) in Example 2 except that the average particle size of synthetic calcium carbonate particles (B1a) contained in polyester (B1a) used in Example 2 was changed from 420 nm to 200 nm, polyester (B1b) was obtained.

In the same manner as in Example 2 except that polyester (B1b) was used instead of polyester (B1a) and polyester (B2a) was not used, a film having the same limiting viscosity number and thickness with the film obtained in Example 2 was obtained.

COMPARATIVE EXAMPLE 9

In the same manner as in the production of polyester (B2a) in Example 2 except that the average particle size and the particle size dispersion of the synthetic calcium carbonate particles (B2a) contained in polyester (B2a) used in Example 2 were changed from 790 nm to 1600 nm and from 23% to 45%, respectively, polyester (B2b) was obtained.

In the same manner as in Example 2 except that polyester (B2b) was used instead of polyester (B2a), and polyester (B1a) was not used, a film having the same limiting viscosity number and thickness with the film obtained in Example 2 was obtained.

EXAMPLE 3

In the same manner as in the production of polyester (B1a) in Example 2 except that the area proportion of synthetic calcium carbonate particles (B1a) relative to the circumscribed circle was changed from 80% to 55%, and the particle size dispersion was changed from 27% to 45%, polyester (B1c) was obtained.

In the same manner as in Example 2 except that polyester (B1c) was used instead of polyester (B1a), a film having the same limiting viscosity number and thickness with the film obtained in Example 2 was obtained.

EXAMPLE 4

In the same manner as in the production of polyester (B1a) in Example 2 except that the average particle size of synthetic calcium carbonate particles (B1a) in polyester (B1a) used in Example 2 was changed to 650 nm, polyester (B1d) was obtained.

In the same manner as in Example 2 except that polyester (B1d) was used instead of polyester (B1a), a film having the same limiting viscosity number and thickness with the film obtained in Example 2 was obtained.

EXAMPLE 5

In the same manner as in the production of polyester (B1a) contained in Example 2 except that synthetic vaterite type spherical calcium carbonate particles having an area proportion relative to the circumscribed circle of 95% and a particle size dispersion of 15% were used instead of synthetic calcite type calcium carbonate particles (B1a) contained in polyester (B1a) used in Example 2, polyester (B1e) was obtained.

In the same manner as in Example 2 except that polyester (B1e) was used instead of polyester (B1a), a film having the same limiting viscosity number and thickness with the film obtained in Example 2 was obtained.

EXAMPLE 6

In the same manner as in the production of polyester (B2a) in Example 2 except that the average particle size of synthetic calcium carbonate particles (B2a) contained in polyester (B2a) used in Example 2 was changed to 750 nm, the area proportion relative to the circumscribed circle was changed to 77% and the particle size dispersion was changed to 16%, polyester (B2c) was obtained.

In the same manner as in Example 2 except that polyester (B2c) was used instead of polyester (B2a) used in Example 2 and polyester (B1a) was not used, a film having the same limiting viscosity number and thickness with the film obtained in Example 2 was obtained.

EXAMPLE 7

The silica particles were synthesized by subjecting silicon tetrachloride of silica particles (A) used in Example 1 to flame hydrolysis under different reaction conditions. That is, silica particles having an average primary particle size ratio (length/breadth) of 1.32, a ratio of average primary particle size/standard deviation of primary particle size of 3.0, a BET specific surface area of 76 $m^2/g$, and a chlorine content of 130 ppm were mixed with ethylene glycol, and the obtained slurry was subjected to wet grinding, centrifugation and filtration to give an ethylene glycol slurry containing silica particles having an average secondary particle size of 90 nm. In the same manner as in the production of polyester (A) of Example 1 except that this slurry was used instead of silica particles (A) used in Example 1, polyester (A6) was obtained.

In the same manner as in the production of polyester (B1) in Example 1 except that crosslinked polystyrene particles [S2467(A), JAPAN SYNTHETIC RUBBER CO., LTD.] having an area proportion relative to the circumscribed circle of 96%, a particle size dispersion of 12%, an average particle size of 450 nm and a thermal decomposition temperature at 10% reduction in weight of 383° C. instead of synthetic calcium carbonate particles (B1) having an average particle size of 510 nm contained in polyester (B1) used in Example 1, polyester (B1f) was obtained.

An unstretched sheet was formed by mixing polyesters (A6), (B1f), (B2a) and (C) in a weight ratio of 15:15:5:65, drying, melt-extruding the mixture at 290° C. and winding the extruded film on a cooling drum by the electrostatic application casting method. Then, the speed of the rolls was changed in the longitudinal direction to draw the film in two steps by 1.36 times at 123° C. and 3.23 times at 127° C. This monoaxially stretched film was drawn in the transverse direction in 3 steps by 1.94 times at 118° C., 1.47 times at 123° C. and 1.32 times at 130° C. using a stenter, which was followed by heat treatment with a hot air at 204° C. while slightly drawing the film by 1.09 times and then relaxation by 2.4% in the transverse direction at said temperature. The film was once cooled, given 0.8% relaxation in the longitudinal direction at 125° C. by varying the speed of the rolls, cooled to room temperature and taken up, whereby a biaxially oriented polyester film having a thickness of 14.5 $\mu$m and a limiting viscosity number of 0.56 was obtained.

EXAMPLE 8

In the same manner as in Example 7 except that the limiting viscosity number of polyesters (A6), (B1f), (B2a) and (C) was adjusted to 0.64, polyesters (A7), (B1g), (B2d) and (C1) were produced.

In the same manner as in Example 7 except that polyesters (A7), (B1g), (B2d) and (C1) were used instead of polyesters (A6), (B1f), (B2a) and (C), a film having a limiting viscosity number of 0.62 and the same thickness with the film obtained in Example 7 was obtained.

EXAMPLE 9

In the same manner as in the production of polyester (B1f) in Example 7 except that silicon resin particles (TOSPEARL 105, manufactured by TOSHIBA SILICON CO., LTD.) having an area proportion relative to the circumscribed circle of 94% and a particle size dispersion of 16%, an average particle size of 500 nm and a thermal decomposition temperature at 10% reduction in weight of 600° C. were used instead of the crosslinked polystyrene particles [S2467 (A)] contained in polyester (B1f) used in Example 7, which had an area proportion relative to the circumscribed circle of 96% and an average particle size of 450 nm, polyester (B1g) was obtained.

In the same manner as in Example 7 except that polyester (B1g) was used instead of polyester (B1f), a film having the same limiting viscosity number and thickness with the film obtained in Example 7 was obtained.

EXAMPLE 10

An unstretched sheet was formed by mixing polyesters (A1), (B1), (B2) and (C) used in Example 1 in a weight ratio of 20:10:3.75:66.25, drying, melt-extruding the mixture at 290° C. and winding the extruded film on a cooling drum by the electrostatic application casting method. Then, the film was drawn in the transverse direction in two steps by 1.20 times at 93° C. and 3.15 times at 87° C. using a stenter. This monoaxially stretched film was heated with an IR heater and drawn in the longitudinal direction by 4.02 times by varying the speed of the low speed roll and high speed roll, which was followed by heat treatment with a hot air at 200° C. while slightly drawing the film by 1.01 times and then relaxation by 1.0% in the transverse direction at said temperature. The film was once cooled, given 0.6% relaxation in the longitudinal direction at 115° C. by varying the speed of the rolls, cooled to room temperature and taken up, whereby a biaxially oriented polyester film having a thickness of 9.5 $\mu$m and a limiting viscosity number of 0.56 was obtained. The film obtained in this Example was particularly preferable for videotapes for long time recording.

EXAMPLE 11

Dimethyl naphthalene-2,6-dicarboxylate (100 parts) and ethylene glycol (52 parts) were charged in an ester exchange reaction vessel equipped with a stirrer, a fractionator and a condenser, and magnesium acetate 4 hydrate (0.06 part) was added with stirring, after which the ester exchange reaction vessel was stood until it cooled to 80° C.

After the temperature in the ester exchange reaction vessel reached 80° C., the ethylene glycol slurry containing silica particles (A) (particle content: 2.0 parts per polymer product 100 parts) used in Example 1 was added and the temperature was gradually raised to 180–240° C. Ester exchange was carried out while continuously distilling away methanol which was concurrently produced from the reaction system. After the ester exchange reaction, antimony trioxide (0.03 part) was added as a catalyst for condensation polymerization and trimethyl phosphate (0.03 part) was added as a heat resistant stabilizer. The temperature was raised to 290° C. while continuously distilling away ethylene glycol, during which time the pressure was simultaneously reduced to 0.2 mmHg for condensation polymerization to give a polyethylene-2,6-naphthalate composition [polyester (A7)] having a limiting viscosity number of 0.58.

In the same manner as in the production of polyester (A7) except that an ethylene glycol slurry containing the synthetic calcium carbonate particles (B1) (particle content: 2.0 parts per polymer product 100 parts) used in Example 1 was used instead of silica particles (A) and added to the ester exchange reaction vessel, and 10 minutes later, antimony trioxide and trimethyl phosphate were added, a polyethylene-2,6-naphthalate composition [polyester (B1h)] having a limiting viscosity number of 0.58 was obtained.

In the same manner as in the production of polyester (A7) except that an ethylene glycol slurry containing the synthetic calcium carbonate particles (B2) (particle content: 2.0 parts per polymer product 100 parts) used in Example 1 was used instead of silica particles (A) and added after the interesterification, and that antimony trioxide and trimethyl phosphate were added 10 minutes later, a polyethylene-2,6-naphthalate composition [polyester (B2e)] having a limiting viscosity number of 0.58 was obtained.

In the above-mentioned production of polyester (A7), silica particles (A) were not added, whereby a polyethylene-2,6-naphthalate composition [polyester (C2)] having a limiting viscosity number of 0.58 which did not contain silica particles or inactive particles was obtained.

Polyesters (A7), (B1h), (B2e) and (C2) were mixed in a weight ratio of 20:10:3.75:66.25, dried and melt-extruded at 300° C. The sheet was wound on a cooling drum by an electrostatic application casting method to give an unstretched sheet. The unstretched sheet was drawn by 5 times to the longitudinal direction and then 4 times in the transverse direction at 130° C., and heat-treated at 210° C. to give a biaxially oriented polyester film having a thickness of 9.5 $\mu$m and a limiting viscosity number of 0.56. The film obtained in this Example is particularly preferable for videotapes for long hour recording, such as E300.

The properties of the polyester films obtained in Examples 1–11 and

Comparative Examples 1–9 are shown in Tables 1–3.

TABLE 1

|  | Example 1 | Comp. Ex. 1 | Comp. Ex. 2 | Comp. Ex. 3 | Comp. Ex. 4 | Comp. Ex. 5 | Comp. Ex. 6 | Example 2 |
|---|---|---|---|---|---|---|---|---|
| [silica particles (A)] | | | | | | | | |
| ave. secondary particle size (nm) | 110 | | 110 | 80 | 110 | 80 | 250 | 110 |
| ave. primary particle size ratio (length/breadth) | 1.35 | | 1.35 | 1.30 | 1.05 | 1.05 | 1.35 | 1.35 |
| ave. primary particle size/ | 2.5 | | 2.5 | 6.0 | 20 | 2.5 | 2.5 | 2.5 |

TABLE 1-continued

|  | Example 1 | Comp. Ex. 1 | Comp. Ex. 2 | Comp. Ex. 3 | Comp. Ex. 4 | Comp. Ex. 5 | Comp. Ex. 6 | Example 2 |
|---|---|---|---|---|---|---|---|---|
| standard deviation of primary particle size |  |  |  |  |  |  |  |  |
| specific surface area ($m^2/g$) | 50 |  | 50 | 200 | 30 | 50 | 50 | 50 |
| chlorine content (ppm) | 50 |  | 50 | 30 | <1 | <1 | 50 | 50 |
| content (% by weight) | 0.4 | none | 1.4 | 0.4 | 0.4 | 0.4 | 0.4 | 0.3 |
| [inactive particles (B)] |  |  |  |  |  |  |  |  |
| <<particle B1>> |  |  |  |  |  |  |  |  |
| Kind | synthetic $CaCO_3$* | synthetic $CaCO_3$* | synthetic $CaCO_3$* | synthetic $CaCO_3$* | synthetic $CaCO_3$* | synthetic $CaCO_3$* | synthetic $CaCO_3$* | synthetic $CaCO_3$* |
| ave. particle size (nm) | 510 | 510 | 510 | 510 | 510 | 510 | 510 | 420 |
| area proportion (%) relative to circumscribed circle | 80 | 80 | 80 | 80 | 80 | 80 | 80 | 80 |
| particle size dispersion (%) | 28 | 28 | 28 | 28 | 28 | 28 | 28 | 27 |
| content (% by weight) | 0.2 | 0.2 | 0.2 | 0.2 | 0.2 | 0.2 | 0.2 | 0.3 |
| <<particle B2>> |  |  |  |  |  |  |  |  |
| Kind | synthetic $CaCO_3$* | synthetic $CaCO_3$* | synthetic $CaCO_3$* | synthetic $CaCO_3$* | synthetic $CaCO_3$* | synthetic $CaCO_3$* | synthetic $CaCO_3$* | synthetic $CaCO_3$* |
| ave. particle size (nm) | 890 | 890 | 890 | 890 | 890 | 890 | 890 | 790 |
| area proportion (%) relative to circumscribed circle | 75 | 75 | 75 | 75 | 75 | 75 | 75 | 80 |
| particle size dispersion (%) | 25 | 25 | 25 | 25 | 25 | 25 | 25 | 23 |
| content (% by weight) | 0.075 | 0.075 | 0.075 | 0.075 | 0.075 | 0.075 | 0.075 | 0.1 |
| difference in ave. particle size (B2 − B1: nm) | 380 | 380 | 380 | 380 | 380 | 380 | 380 | 370 |
| kind of polymer | PET | PET | PET | PET | PET | PET | PET | PET |
| [properties of film] |  |  |  |  |  |  |  |  |
| intrinsic viscosity | 0.56 | 0.56 | 0.56 | 0.5 | 0.56 | 0.56 | 0.56 | 0.56 |
| surface roughness: SRa (nm) | 19 | 19 | 22 | 19 | 19 | 20 | 24 | 19 |
| slipping property: μd | 0.44 | 0.44 | 0.42 | 0.4 | 0.44 | 0.44 | 0.42 | 0.43 |
| winding property | ⊚ | ⊚ | ⊚ | ⊚ | ⊚ | ⊚ | ⊚ | ⊚ |
| resistance to scraping | ⊚ | X | X | ○ | X | X | X | ⊚ |
| scratch resistance | ⊚ | XX | ⊚ | X | ○ | ○ | ○ | ⊚ |
| slitting property | ⊚ | XX | ⊚ | X | XX | Δ | ○ | ⊚ |

Note:
*calcite type synthetic $CaCO_3$

TABLE 2

|  | Comp. Ex. 7 | Comp. Ex. 8 | Comp. Ex. 9 | Example 3 | Example 4 | Example 5 | Example 6 | Example 7 |
|---|---|---|---|---|---|---|---|---|
| [silica particles (A)] |  |  |  |  |  |  |  |  |
| ave. secondary particle size (nm) | 110 | 110 | 110 | 110 | 110 | 110 | 110 | 90 |
| ave. primary particle size ratio (length/breadth) | 1.35 | 1.35 | 1.35 | 1.35 | 1.35 | 1.35 | 1.35 | 1.32 |
| ave. primary particle size/ standard deviation of primary particle size | 2.5 | 2.5 | 2.5 | 2.5 | 2.5 | 2.5 | 2.5 | 3.0 |
| specific surface area ($m^2/g$) | 50 | 50 | 50 | 50 | 50 | 50 | 46 | 76 |
| chlorine content (ppm) | 50 | 50 | 50 | 50 | 50 | 50 | 50 | 130 |
| content (% by weight) | 0.3 | 0.3 | 0.3 | 0.3 | 0.3 | 0.3 | 0.4 | 0.3 |
| [inactive particles (B)] |  |  |  |  |  |  |  |  |
| <<particle B1>> |  |  |  |  |  |  |  |  |
| Kind | synthetic $CaCO_3$* | synthetic $CaCO_3$* |  | synthetic $CaCO_3$* | synthetic $CaCO_3$* | synthetic $CaCO_3$** |  | poly-styrene*** |
| ave. particle size (nm) | 420 | 200 |  | 420 | 650 | 420 |  | 450 |
| area proportion (%) relative to circumscribed circle | 80 | 80 |  | 55 | 80 | 95 |  | 96 |
| particle size dispersion (%) | 27 | 27 |  | 35 | 27 | 15 |  | 12 |
| content (% by weight) | 1.2 | 0.3 | none | 0.3 | 0.3 | 0.3 | none | 0.3 |
| <<particle B2>> |  |  |  |  |  |  |  |  |
| Kind | synthetic $CaCO_3$* |  | synthetic $CaCO_3$* | synthetic $CaCO_3$* | synthetic $CaCO_3$* | synthetic $CaCO_3$* | synthetic $CaCO_3$* | synthetic $CaCO_3$* |
| ave. particle size (nm) | 790 |  | 1600 | 790 | 790 | 790 | 750 | 790 |
| area proportion (%) relative to circumscribed circle | 80 |  | 80 | 80 | 80 | 80 | 77 | 80 |

TABLE 2-continued

|  | Comp. Ex. 7 | Comp. Ex. 8 | Comp. Ex. 9 | Example 3 | Example 4 | Example 5 | Example 6 | Example 7 |
|---|---|---|---|---|---|---|---|---|
| particle size dispersion (%) | 23 |  | 45 | 23 | 23 | 23 | 26 | 23 |
| content (% by weight) | 0.1 | none | 0.1 | 0.1 | 0.1 | 0.1 | 0.20 | 0.1 |
| difference in ave. particle size (B2 − B1: nm) | 370 | — | — | 370 | 140 | 370 | — | 340 |
| kind of polymer | PET | PET | PET | PET | PET | PET | PET | PET |

TABLE 3

|  | Example 8 | Example 9 | Example 10 | Example 11 |
|---|---|---|---|---|
| [silica particles (A)] | | | | |
| ave. secondary particle size (nm) | 90 | 90 | 110 | 110 |
| ave. primary particle size ratio (length/breadth) | 1.32 | 1.32 | 1.35 | 1.35 |
| ave. primary particle size/ standard deviation of primary particle size | 3.0 | 3.0 | 2.5 | 2.5 |
| specific surface area (m$^2$/g) | 76 | 76 | 50 | 50 |
| chlorine content (ppm) | 130 | 130 | 50 | 50 |
| content (% by weight) | 0.3 | 0.3 | 0.4 | 0.3 |
| [inactive particles (B)] | | | | |
| <<particle B1>> | | | | |
| Kind | polystyrene*** | silicon resin | synthetic CaCO$_3$* | synthetic CaCO$_3$* |
| ave. particle size (nm) | 450 | 500 | 510 | 420 |
| area proportion (%) relative to circumscribed circle | 96 | 94 | 80 | 80 |
| particle size dispersion (%) | 12 | 16 | 28 | 27 |
| content (% by weight) | 0.3 | 0.3 | 0.2 | 0.3 |
| <<particle B2>> | | | | |
| Kind | synthetic CaCO$_3$* | synthetic CaCO$_3$* | synthetic CaCO$_3$* | synthetic CaCO$_3$* |
| ave. particle size (nm) | 790 | 790 | 890 | 790 |
| area proportion (%) relative to circumscribed circle | 80 | 80 | 75 | 80 |
| particle size dispersion (%) | 23 | 23 | 25 | 23 |
| content (% by weight) | 0.1 | 0.1 | 0.075 | 0.1 |
| difference in ave. particle size (B2 − B1: nm) | 340 | 390 | 380 | 370 |
| kind of polymer | PET | PET | PET | PEN |
| [properties of film] | | | | |
| intrinsic viscosity | 0.62 | 0.56 | 0.56 | 0.56 |
| surface roughness: SRa (nm) | 21 | 22 | 16 | 16 |
| slipping property: μd | 0.40 | 0.42 | 0.48 | 0.46 |
| winding property | ⊚ | ⊚ | ⊚ | ⊚ |
| resistance to scraping | ○ | ⊚ | ⊚ | ⊚ |
| scratch resistance | ○ | ⊚ | ⊚ | ⊚ |
| slitting property | ○ | ⊚ | ⊚ | ⊚ |

Note:
*calcite type synthetic CaCO$_3$
***crosslinked polystyrene

As is evident from Tables 1–3, the film of the present invention is superior in slipping property, winding property, resistance to scraping, scratch resistance and slitting property and has high quality.

EXAMPLE 12

A polyester containing silica particles (a) was obtained by the following method.

Terephthalic acid (86.4 parts) and ethylene glycol (64.4 parts) were charged in an esterification reaction vessel while cooling the vessel, and antimony trioxide (0.03 part) as a catalyst and magnesium acetate 4 hydrate (0.088 part) and triethylamine (0.16 part) were charged with stirring, which was followed by standing until the reaction vessel cooled to 80° C.

Silica particles obtained by flame hydrolysis of silicon tetrachloride were mixed with ethylene glycol and the obtained slurry was subjected to wet grinding and centrifugation to give an ethylene glycol slurry containing silica particles having a BET specific surface area of 50 m$^2$/g and an average particle size of 110 nm.

After the temperature in the esterification reaction vessel reached 80° C., the above-mentioned slurry (particle content: 2.0 parts per polymer product 100 parts) was added to the esterification reaction vessel. Five minutes later, the pressure and temperature were raised to carry out pressurization esterification at gauge pressure of 3.5 kg/cm$^2$ and at 240° C. Then, the esterification reaction vessel was depressurized to the normal pressure and trimethyl phosphate (0.033 part) was added. Five minutes after the addition of trimethyl phosphate, the esterification reaction product was transferred to a condensation polymerization vessel and subjected to condensation polymerization under reduced pressure at 280° C. to give a polyester having a limiting viscosity number of 0.58, which was used as polyester (a).

A polyester containing synthetic calcium carbonate particles (b) was obtained by the following method.

An esterification reaction vessel was heated and when it reached 200° C., terephthalic acid (86.4 parts) and ethylene glycol (64.4 parts) were charged therein, and antimony trioxide (0.03 part) as a catalyst and magnesium acetate 4 hydrate (0.088 part) and triethylamine (0.16 part) were added with stirring. Then, pressure and temperature were raised to carry out pressurization esterification at gauge pressure of 3.5 kg/cm$^2$ and at 240° C. Then, the esterification reaction vessel was depressurized to the normal pressure and trimethyl phosphate (0.040 part) was added. The reaction vessel was heated to 260° C., and 15 minutes after the addition of trimethyl phosphate, the reaction mixture was subjected to centrifugation. An ethylene glycol slurry containing synthetic calcite type calcium carbonate particles (particle content: 2.0 parts per polymer product 100 parts) having an area proportion of 80% relative to the circumscribed circle and an average particle size of 510 nm, and containing, as a dispersing agent, an aqueous solution of sodium tripolyphosphate, such that Na atom was contained in a proportion of 0.1% by weight of calcium carbonate. Fifteen minutes later, the obtained esterification reaction product was transferred to a condensation polymerization vessel and subjected to condensation polymerization under reduced pressure at 280° C. to give a polyester having a limiting viscosity number of 0.58, which was used as polyester (b).

In the same manner as in the production of polyester (b) except that a slurry containing synthetic calcite type calcium carbonate particles (c) having an area proportion relative to the circumscribed circle of 75% and an average particle size of 890 nm (particle content: 2.0 parts per polymer product 100 parts) was added instead of synthetic calcite type calcium carbonate particles (b) having an average particle size of 510 nm, a polyester having a limiting viscosity number of 0.58 was obtained. This was used as polyester (c).

In the same manner as in the production of polyester (b) except that synthetic calcite type calcium carbonate particles (b) having an average particle size of 0.5 $\mu$m were not added, a polyester having a limiting viscosity number of 0.58 and containing no fine particles was obtained. This was used as polyester (d).

The polyesters (a), (b), (c) and (d) were mixed in a weight ratio of 20:10:3.75:66.25 and the mixture was dried and melt-extruded at 290° C. The obtained unstretched film was drawn by 3.6 times in the longitudinal direction at 90° C. and 3.7 times in the transverse direction at 110° C., which was followed by heat treatment at 220° C. to give a 14.5 $\mu$m thick biaxially oriented polyester film having a limiting viscosity number of 0.56.

COMPARATIVE EXAMPLE 10

In the same manner as in Example 12 except that polyester (a) containing silica particles (a) synthesized by flame hydrolysis of silicon tetrachloride were not used and the polyesters (b), (c) and (d) were mixed in a weight ratio of 10:3.75:86.25, a film having the same thickness and limiting viscosity number with the film of Example 12 was obtained.

COMPARATIVE EXAMPLE 11

In the same manner as in Example 12 except that polyesters (a), (b), (c) and (d) were mixed in a weight ratio of 70:10:3.75:16.25, a film having the same thickness and limiting viscosity number with the film of Example 12 was obtained.

COMPARATIVE EXAMPLE 12

In the same manner as in Example 12 except that ethylene glycol slurry containing colloidal silica particles obtained using sodium silicate as a starting material and by removing alkali (sodium) component in a wet system, which had an average particle size of 110 nm and a specific surface area of 50 m$^2$/g were used instead of silica particles synthesized by flame hydrolysis of silicon tetrachloride, a film having the same thickness and the same limiting viscosity number with the film of Example 12 was obtained.

COMPARATIVE EXAMPLE 13

In the same manner as in Example 12 except that particles having a specific surface area of 20 m$^2$/g were used as the silica particles synthesized by flame hydrolysis of silicon tetrachloride, a film having the same thickness and the same limiting viscosity number with the film of Example 12 was obtained.

COMPARATIVE EXAMPLE 14

In the same manner as in Example 12 except that particles having a specific surface area of 25 m$^2$/g were used as the silica particles synthesized by flame hydrolysis of silicon tetrachloride, a film having the same thickness and the same limiting viscosity number with the film of Example 12 was obtained.

COMPARATIVE EXAMPLE 15

In the same manner as in Example 12 except that particles having an average particle size of 250 nm were used as the silica particles synthesized by flame hydrolysis of silicon tetrachloride, a film having the same thickness and the same limiting viscosity number with the film of Example 12 was obtained.

COMPARATIVE EXAMPLE 16

In the same manner as in Example 12 except that particles having an average particle size of 30 nm were used as the silica particles synthesized by flame hydrolysis of silicon tetrachloride, a film having the same thickness and the same limiting viscosity number with the film of Example 12 was obtained.

COMPARATIVE EXAMPLE 17

In the same manner as in Example 12 except that polyester (b) was not used and polyesters (a), (c) and (d) were mixed in a weight ratio of 20:3.75:76.25, a film having the same thickness and the same limiting viscosity number with the film of Example 12 was obtained.

EXAMPLE 13

In the same manner as in the production of polyester (b) in Example 1 except that synthetic calcite type calcium carbonate particles having an area proportion of 80% relative to the circumscribed circle and an average particle size of 420 nm were used as particle (b) instead of synthetic calcium carbonate particles having an average particle size of 510 nm, polyester (b2) was obtained.

In the same manner as in the production of polyester (c) in Example 12 except that synthetic calcite type calcium carbonate particles having an area proportion of 80% relative to the circumscribed circle and an average particle size of 790 nm were used as particle (c) instead of synthetic calcium carbonate particles having an average particle size of 890 nm, polyester (c2) was obtained.

In the same manner as in Example 12 except that polyesters (a), (b2), (c2) and (d) were mixed at a weight ratio of 15:15:5:65, a film having the same thickness and the same limiting viscosity number with the film of Example 12 was obtained.

COMPARATIVE EXAMPLE 18

In the same manner as in Example 13 except that polyester (c2) was not used and polyesters (a), (b2) and (d) were mixed at a weight ratio of 15:15:70, a film having the same thickness and the same limiting viscosity number with the film of Example 13 was obtained.

COMPARATIVE EXAMPLE 19

In the same manner as in Example 13 except that polyesters (a), (b2), (c2) and (d) were mixed at a weight ratio of 15:35:5:45, a film having the same thickness and the same limiting viscosity number with the film of Example 13 was obtained.

COMPARATIVE EXAMPLE 20

In the same manner as in Example 13 except that polyesters (a), (b2), (c2) and (d) were mixed at a weight ratio of 15:15:20:50, a film having the same thickness and the same limiting viscosity number with the film of Example 13 was obtained.

COMPARATIVE EXAMPLE 21

In the same manner as in polyester (b2) of Example 13 except that the average particle size of the synthetic calcium carbonate particles (b) was changed from 420 nm to 200 nm, polyester (b3) was obtained. In the same manner as in Example 13 except that polyester (b3) was used instead of polyester (b2), a film having the same thickness and the same limiting viscosity number with the film of Example 13 was obtained.

COMPARATIVE EXAMPLE 22

In the same manner as in polyester (c) of Example 12 except that the average particle size of the synthetic calcium carbonate particles (c) was changed from 890 nm to 1600 nm, polyester (c3) was obtained. In the same manner as in Example 13 except that polyester (c3) was used instead of polyester (c), a film having the same thickness and the same limiting viscosity number with the film of Example 13 was obtained.

EXAMPLE 14

In the same manner as in polyester (b2) of Example 13 except that the area proportion relative to the circumscribed circle of synthetic calcium carbonate particle (b) was changed from 80% to 55%, polyester (b4) was obtained.

In the same manner as in Example 13 except that polyester (b4) was used instead of polyester (b2), a film having the same thickness and the same limiting viscosity number with the film of Example 13 was obtained.

EXAMPLE 15

In the same manner as in the production of polyester (b2) in Example 13 except that the average particle size of synthetic calcium carbonate particles (b) was changed to 650 nm, polyester (b5) was obtained.

In the same manner as in Example 13 except that polyester (b5) was used instead of polyester (b2), a film having the same thickness and the same intrinsic viscosity with the film of Example 13 was obtained.

EXAMPLE 16

In the same manner as in polyester (b2) in Example 13 except that synthetic vaterite type spherical calcium carbonate particles having an area proportion relative to the circumscribed circle of 95% were used as the synthetic calcium carbonate particles (b), a film having the same thickness and the same intrinsic viscosity with the film of Example 13 was obtained.

The properties of the polyester films obtained in Examples 12–16 and Comparative Examples 10–22 are shown in Tables 4 and 5.

TABLE 4

|  | Ex. 1 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| [inorganic particles] | | | | | | | | | |
| <<silica particles (A)>> | | | | | | | | | |
| production method | flame hydrolysis[1] | none | flame hydrolysis[1] | alkali removal[2] | flame hydrolysis[1] | flame hydrolysis[1] | flame hydrolysis[1] | flame hydrolysis[1] | flame hydrolysis[1] |
| specific surface area (m²/g) | 50 | | 50 | 50 | 200 | 25 | 50 | 50 | 50 |
| ave. particle size (nm) | 110 | | 110 | 110 | 110 | 110 | 250 | 30 | 110 |
| content (% by weight) | 0.4 | | 1.4 | 0.4 | 0.4 | 0.4 | 0.4 | 0.4 | 0.4 |
| <<synthetic calcium carbonate (B)>> | | | | | | | | | |
| ave. particle size (nm) | 510 | 510 | 510 | 510 | 510 | 510 | 510 | 510 | none |
| content (% by weight) | 0.2 | 0.2 | 0.2 | 0.2 | 0.2 | 0.2 | 0.2 | 0.2 | |
| <<synthetic calcium carbonate (C)>> | | | | | | | | | |
| ave. particle size (nm) | 890 | 890 | 890 | 890 | 890 | 890 | 890 | 890 | 890 |
| content (% by weight) | 0.075 | 0.075 | 0.075 | 0.075 | 0.075 | 0.075 | 0.075 | 0.075 | 0.075 |
| [properties of film] | | | | | | | | | |
| surface roughness: SRa (nm) | 19 | 19 | 22 | 19 | 19 | 20 | 24 | 19 | 16 |

TABLE 4-continued

|  | Ex. 1 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| slipping property: μd | 0.44 | 0.44 | 0.42 | 0.44 | 0.44 | 0.44 | 0.42 | 0.44 | 0.48 |
| winding property | ⊚ | ⊚ | ⊚ | ⊚ | ⊚ | ⊚ | ⊚ | ⊚ | X |
| resistance to scraping | ⊚ | X | X | X | ⊚ | X | X | ⊚ | ◯ |
| scratch resistance | ⊚ | XX | ⊚ | ◯ | X | ⊚ | ◯ | XX | ⊚ |

Note:
[1] flame hydrolysis of silicon tetrachloride
[2] alkali removal of sodium silicate

TABLE 5

|  | Ex. 2 | Comp. Ex. 9 | Comp. Ex. 10 | Comp. Ex. 11 | Comp. Ex. 12 | Comp. Ex. 13 | Ex. 3 | Ex. 4 | Ex. 5 |
|---|---|---|---|---|---|---|---|---|---|
| [inorganic particles] | | | | | | | | | |
| <<silica particles (A)>> | | | | | | | | | |
| production method | flame hydrolysis[1] | flame hydrolysis[1] | flame hydrolysis[1] | flame hydrolysis[1] | flame hydrolysis[1] | flame hydrolysis[1] | flame hydrolysis[1] | flame hydrolysis[1] | flame hydrolysis[1] |
| specific surface area (m²/g) | 50 | 50 | 50 | 50 | 50 | 50 | 50 | 50 | 50 |
| ave. particle size (nm) | 110 | 110 | 110 | 110 | 110 | 110 | 110 | 110 | 110 |
| content (% by weight) | 0.3 | 0.3 | 0.3 | 0.3 | 0.3 | 0.3 | 0.3 | 0.3 | 0.3 |
| <<synthetic calcium carbonate (B)>> | | | | | | | | | |
| ave. particle size (nm) | 420 | 420 | 420 | 420 | 200 | 420 | 420[3] | 650 | 420[5] |
| content (% by weight) | 0.3 | 0.3 | 0.7 | 0.3 | 0.3 | 0.3 | 0.3 | 0.3 | 0.3 |
| <<synthetic calcium carbonate (C)>> | | | | | | | | | |
| ave. particle size (nm) | 790 | none | 790 | 790 | 790 | 1600 | 790 | 790[4] | 790 |
| content (% by weight) | 0.1 | | 0.1 | 0.4 | 0.1 | 0.1 | 0.1 | 0.1 | 0.1 |
| [properties of film] | | | | | | | | | |
| surface roughness: SRa (nm) | 19 | 15 | 23 | 30 | 17 | 32 | 19 | 24 | 23 |
| slipping property: μd | 0.43 | 0.48 | 0.38 | 0.34 | 0.48 | 0.31 | 0.46 | 0.41 | 0.39 |
| winding property | ⊚ | X | ◯ | X | X | XX | ◯ | ◯ | ⊚ |
| resistance to scraping | ⊚ | ◯ | X | XX | X | XX | ◯ | ⊚ | ⊚ |
| scratch resistance | ⊚ | ⊚ | ⊚ | ◯ | ⊚ | ◯ | ⊚ | ⊚ | ⊚ |

Note:
[1] flame hydrolysis of silicon tetrachloride
[3] synthetic calcium carbonate particles having area proportion relative to circumscribed circle of 55%
[4] difference in average particle size between synthetic calcium carbonates (C) and (B) being 100 nm
[5] vaterite type synthetic calcium carbonate As is evident from Tables 4 and 5, the film of the present invention is superior in slipping property, winding property, resistance to scraping and scratch resistance, and has high quality.

The oriented polyester film of the present invention contains specific amounts of silica particles (A) having particular average secondary particle size, average primary particle size ratio (length/breadth) and ratio of average primary particle size/standard deviation of primary particle size, as well as inactive particles (B) having particular average particle size. Accordingly, the polyester film of the present invention is superior in winding property, resistance to scraping, slitting property and scratch resistance, and has high quality. As a result, it can be adapted to a high speed feeding of a film or tape in the production line and the use of economical parts in an attempt to achieve a decrease in the costs of tapes. This polyester film is particularly preferably used as a base film of magnetic recording media.

What is claimed is:

1. A biaxially oriented polyester film comprising silica particles (A) having an average primary particle size ratio (length/breadth) of 1.25–3.0, a ratio of average primary particle size/standard deviation of primary particle size (d/σ) of 0.5–5.0 in a proportion of 0.1–1% by weight and an average secondary particle size of 50–200 nm and inactive particles (B) having an average particle size of 300–1500 nm in a proportion of 0.01–1% by weight.

2. The oriented polyester film of claim 1, wherein the specific surface area of the silica particles (A) is 30–80 m²/g.

3. The oriented polyester film of claim 1, wherein the silica particles (A) contains chlorine atom in a proportion of 10–500 ppm.

4. The oriented polyester film of claim 1, wherein the inactive particle (B) is at least one member selected from the group consisting of synthetic calcium carbonate particles and heat-resistant organic polymer particles.

5. The oriented polyester film of claim 1, wherein the area proportion of the inactive particles (B) relative to a circumscribed circle is not less than 60%.

6. The oriented polyester film of claim 1, wherein the dispersion in the particle size of the inactive particle (B) is not more than 50%.

7. The oriented polyester film of claim 1, wherein the inactive particles (B) comprise inactive particles (B1) having an average particle size of 300–650 nm in a proportion of 0.05–0.5% by weight and inactive particles (B2) having an average particle size of 750–1300 nm in a proportion of 0.01–0.25% by weight.

8. The oriented polyester film of claim 7, wherein the average particle size area proportion differs between the inactive particles (B2) and the inactive particles (B1) by 200–600 nm.

9. The oriented polyester film of claim 1, wherein the limiting viscosity number of the film is 0.5–0.6 dl/g.

* * * * *